United States Patent [19]

Valliant

[11] Patent Number: 4,971,613
[45] Date of Patent: Nov. 20, 1990

[54] VANE TYPE MIST EXTRACTOR WITH EXTENDED DRAIN

[75] Inventor: Charles B. Valliant, Richardson, Tex.

[73] Assignee: Peerless Manufacturing Company, Dallas, Tex.

[21] Appl. No.: 382,249

[22] Filed: Jul. 19, 1989

[51] Int. Cl.⁵ .............................................. B01D 45/00
[52] U.S. Cl. ...................................... 55/440; 55/257.2
[58] Field of Search ................. 55/257.2, 440, 443–446

[56] References Cited

U.S. PATENT DOCUMENTS 3,691,733  9/1972  Stockford .......................... 55/440 X
4,058,381  11/1977  Traiteur ................................. 55/444

FOREIGN PATENT DOCUMENTS 0428763  5/1974  U.S.S.R. .................................. 55/440

Primary Examiner—Charles Hart
Attorney, Agent, or Firm—Richards, Medlock & Andrews

[57] ABSTRACT

A vane type mist extractor (100) is disclosed which has a collection chamber (102) which includes a portion (106) which extends downstream from the lower portion of the vanes (14) in the extractor. The portion (106) limits the bypass of any vapor flow around the bottom edges of the vanes through the collection chamber which is present in prior designs.

5 Claims, 3 Drawing Sheets

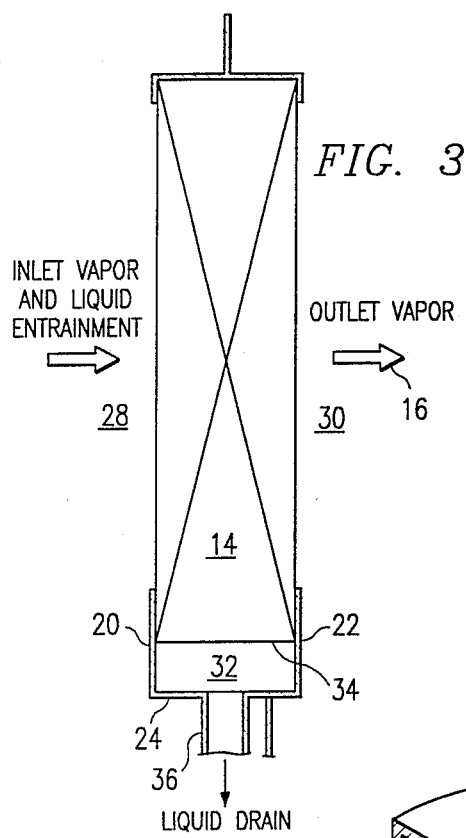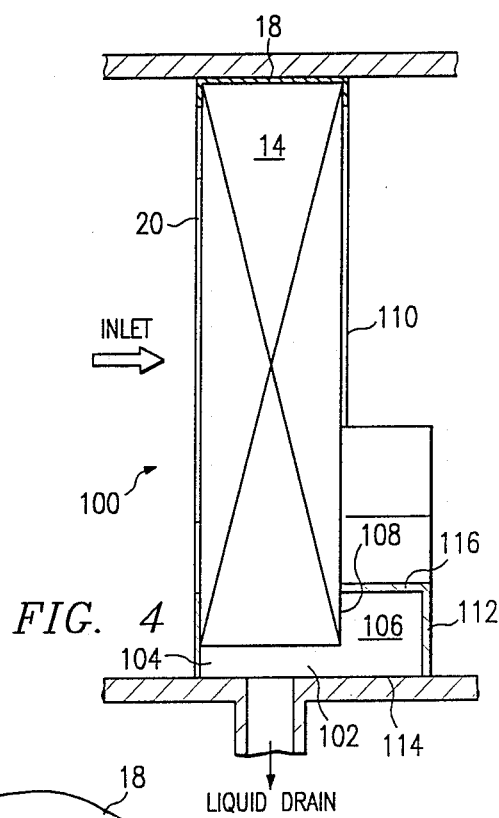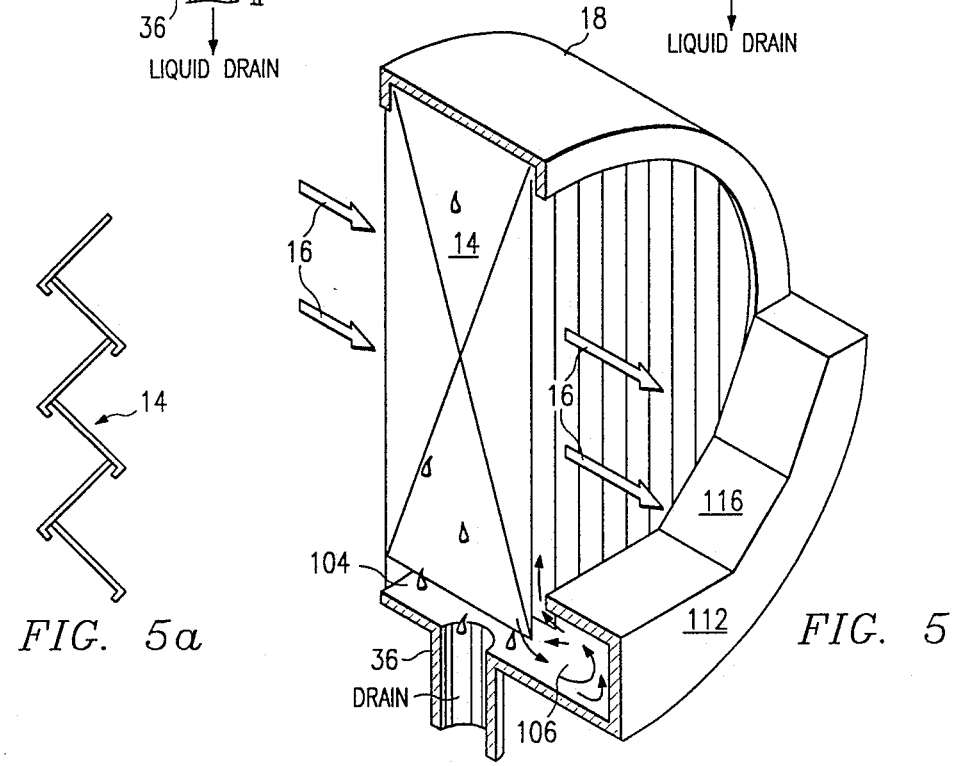

VANE TYPE MIST EXTRACTOR WITH EXTENDED DRAIN

TECHNICAL FIELD

This invention relates to a separator for separating a liquid from a vapor flow, and in particular to the type of separator using vertical vanes to form a tortuous path to separate the liquid from the vapor.

BACKGROUND OF THE INVENTION

Vane type mist extractors have been used extensively for more than fifty years for the high efficiency separation of entrained liquids from flowing gas or vapor streams. The vane type mist extractor includes a vane bundle made up of a plurality of vanes which generally extend vertically and perpendicular to the vapor flow path. Liquid particles in the vapor flow impinge on the tortuous path of the vane surfaces as the vapor flows through the vane bundle. The liquid particles collect on the vane surfaces and drain downwardly by gravity to a collection chamber or drain below the vanes. The separated liquid is drained from the collection chamber for disposal, recycling or the like.

Traditionally, the vane type mist extractor has included baffles about the vane bundle to confine the vapor flow through the bundle. At the bottom of the extractor, vertically extending plates are typically mounted flush against the front and back of the vanes and extend upward about three inches from the bottom of the vanes. The plates are interconnected by a bottom plate to define a hollow interior collection chamber below the vanes.

While the conventional mist extractor has proven satisfactory in many applications, there is an ongoing need to increase the efficiency of operation of a mist extractor to satisfy high performance goals and increase efficiency.

SUMMARY OF THE INVENTION

In accordance with one aspect of the present invention, a vane type mist extractor is disclosed which includes a vane bundle having a plurality of vertically extending vanes to separate liquid from a vapor flow. The mist extractor also includes a frame having a collection chamber below the vanes which extends downstream from the vanes in the direction of the vapor flow to limit bypass of vapor below the vanes, thereby enhancing the efficiency of the extractor.

In accordance with another aspect of the present invention, the collection chamber extends downstream from at least a portion of the downstream surface of the vanes to limit bypass of vapor beneath the vanes.

BRIEF DESCRIPTION OF THE DRAWINGS

Further objects and advantages of the invention will become more apparent from the following description and claims, and from the accompanying drawings, wherein:

FIG. 3 is a vertical cross sectional view taken along line 3—3 in FIG. 1;

FIG. 4 is a vertical cross sectional view of a vane type mist extractor forming a first embodiment of the present invention;

FIG. 5 is a perspective cross sectional view of the vane type mist extractor of FIG. 4;

DETAILED DESCRIPTION

Figure 1:
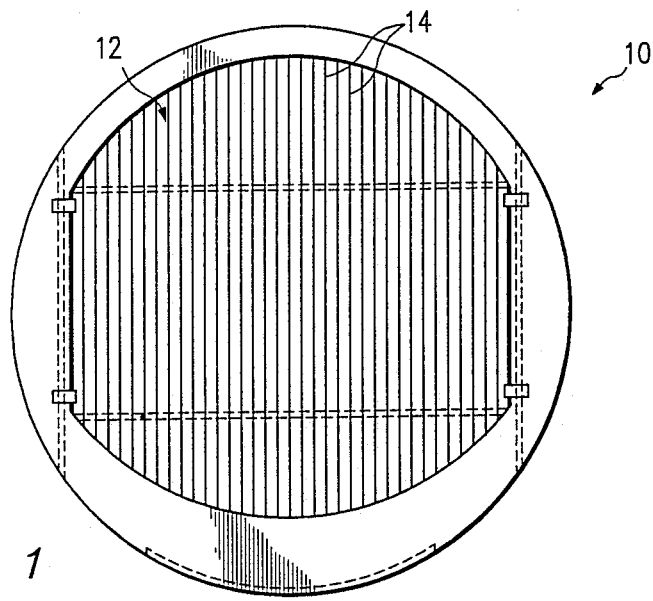
FIG. 1 is a front view of a vane type mist extractor constructed in accordance with the teachings of the prior art.
Figure 2:
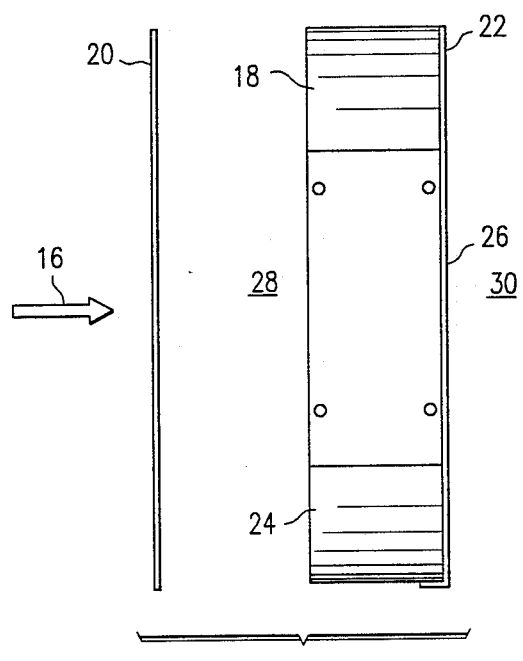
FIG. 2 is a side view of the vane type mist extractor of FIG. 1.

With reference to the accompanying figures, wherein like reference numerals designate like or corresponding parts throughout the several views, there is illustrated a prior art vane type mist extractor 10 in FIGS. 1-3.

The mist extractor 10 includes a vane bundle 12 having a plurality of vertically oriented vanes 14 which define a tortuous path through the mist extractor in the direction 16 of vapor flow to cause separation of the liquid in the vapor from the gaseous phase of the vapor.

The mist extractor 10 also includes a top cover plate 18, front cover 20, rear cover 22 and bottom cover plate 24. The plates and covers define a frame 26 to support the vane bundle 12 and mount mist extractor 10 in the bulkhead of a ship, for example, or any other application where a mist extractor would be of benefit. The plates and covers further act to direct the vapor flow through the vane bundle 12 from the inlet side 28 to the outlet side 30.

As best seen in FIG. 3, the intersection of front cover 20, rear cover 22 and bottom cover plate 24 defines a hollow collection chamber 32 beneath the bottom edges 34 of the vanes 14. Liquid particles impinging on the tortuous path of the vane surfaces collect on the surfaces and drain downward by gravity along the vanes into the collection chamber 32. A drain line 36 is provided to drain the separated liquid from the chamber 32 for disposal or recycling, as desired.

While the mist extractor of the type described hereinabove is adequate, an improved vane type mist extractor 100 is disclosed in FIGS. 4 and 5 which provides for enhanced separation of the liquid from the vapor flow.

With reference to FIGS. 4 and 5, the mist extractor 100 can be seen to have a number of components identical to mist extractor 10 and these identical components are identified by the same reference numerals. However, it will be seen that mist extractor 100 has an enlarged collection chamber 102 which is divided into a portion 104 beneath the bottom edges 34 of the vanes, as is used in mist extractor 10, but also includes an enclosed portion or extended drain 106 which is downstream of the vanes 14 in the direction of the vapor flow. Preferably, section 108 of the rear surface 110 of the vane bundle opens into the portion 106. The mist extractor 100 can be readily modified from the design of mist extractor 10 by providing a vertical plate 112 extending upward from the bottom cover plate 114 and a top cover plate 116 which provides a top to the portion 106. For example, plate 114 can be positioned about three inches downstream of the vanes, and extends upwardly from the plate 114 for about three inches.

Figure 6:
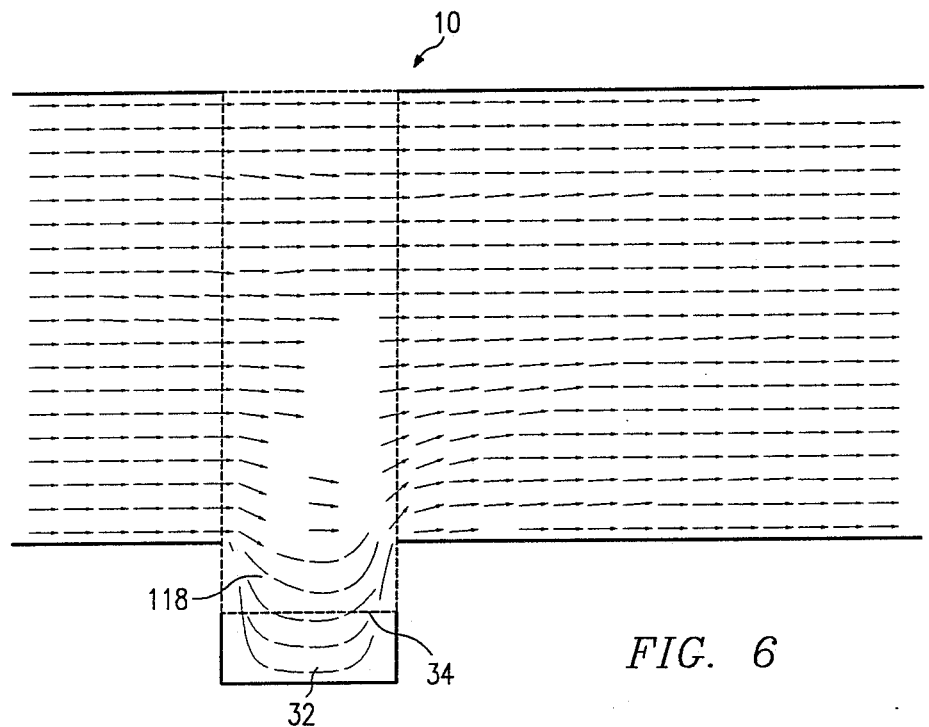
FIG. 6 is a computer generated representation of the vapor flow path through the vane type mist extractor of FIGS. 1-3.
Figure 7:
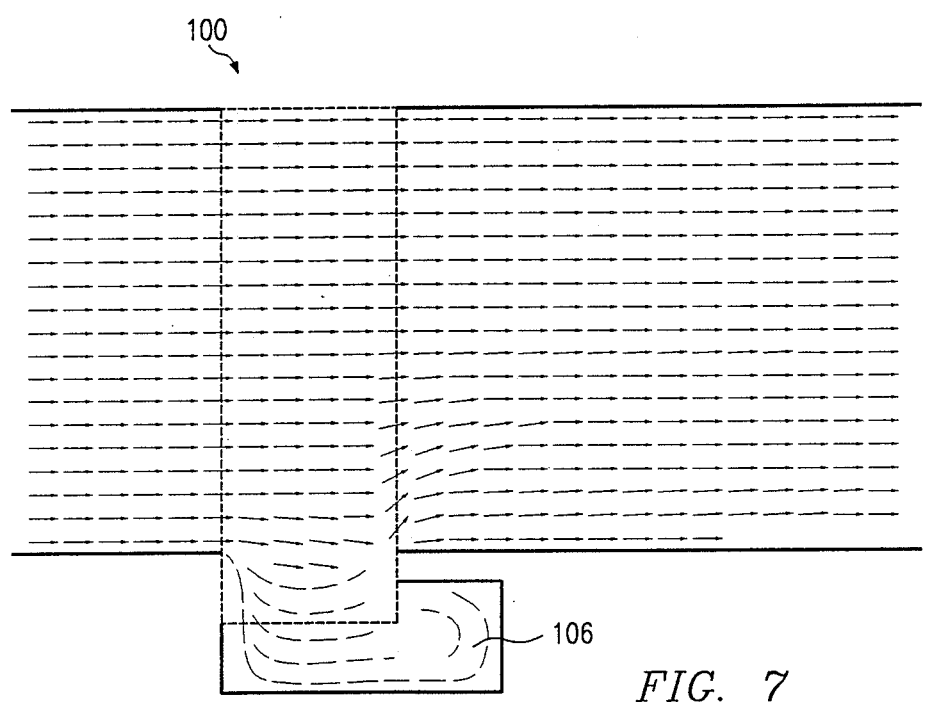
FIG. 7 is a computer generated flow pattern of vapor flow through the vane type mist extractor of FIGS. 4 and 5.

With reference to FIGS. 6 and 7, a computer model of the vapor flow through the conventional mist extractor 10 is illustrated in FIG. 6. It can be seen that portions 118 of the vapor flow actually flow down past the bottom edges 34 of the vanes, along the hollow collection chamber 32, and back up past the bottom edges 34 of the vanes near the rear of the extractor before passing from the extractor. Thus, a portion of the vapor flow essentially bypasses the vanes, which reduces the efficiency of moisture separation. However, reference to FIG. 7, which is a computer generated model of the air flow through the mist extractor 100, illustrates that the presence of extended drain portion 106 downstream of the vanes prevents such bypass of the vapor, providing for a more efficient separation of the liquid from the vapor flow. The phenomena illustrated in FIG. 6 has also been observed by looking at the flow in a mist extractor through a plexiglas sight window in a test vessel. Such bypass occurred after the vapor flow rate was increased above a predetermined rate, which originally established the separator capacity. Tests of a mist extractor constructed in accordance with the design of mist extractor 100 have achieved desired liquid separation efficiency at the vapor flow rates up to 1.52 times the capacity for which the mist extractor was originally designed without the benefit of the portion 106. Further, visual observation of the vapor liquid flow through the mist extractor showed that the portion 106 had eliminated all bypassing of vapor and liquid through the collection chamber beneath the vanes at high flow rates.

Although a single embodiment in the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit and scope of the invention.

I claim:

1. A vane type mist extractor for extracting a liquid from a vapor flowing in a first direction, comprising:
   a vane bundle, including a plurality of vertically extending vanes to separate liquid from the vapor flow;
   a frame having a collection chamber below the vanes which includes an enclosed portion extending downstream in the direction of the vapor flow from the vanes to limit the bypass of vapor below the vanes, said enclosed portion isolated from the vapor flow downstream of the vanes.

2. The vane type mist extractor of claim 1 wherein at least a portion of the downstream side of the vanes open into the collection chamber to limit the bypass of the vapor below the vanes.

3. The vane type mist extractor of claim 2 wherein approximately the lower three inches of the downstream side of the vanes open into the collection chamber.

4. A vane type mist extractor for extracting a liquid from a vapor flowing a first direction, comprising:
   a vane bundle including a plurality of vertical extending vanes separating liquid from the vapor flow;
   a frame supporting the vane bundle and defining a collection chamber below the vanes to collect liquids separated by the vapor flow by the vanes, the collection chamber including an enclosed portion extending downstream in the direction of the vapor flow from the vanes to limit the bypass of vapor below the vanes, said enclosed portion being isolated from the vapor flow downstream of the vanes.

5. The mist extractor of claim 4 wherein the frame includes a baffle extending in a generally horizontal manner from the downstream side of the vanes at a point about three inches from the bottom of the vanes and extending downstream in the direction of the vapor flow from the vanes at least three inches, said frame further including a horizontal plate extending downwardly from the downstream end of the horizontal plate.

* * * * *